Nov. 12, 1940.     J. J. CROWE     2,221,077
GAS SUPPLY SYSTEM
Filed Oct. 19, 1938
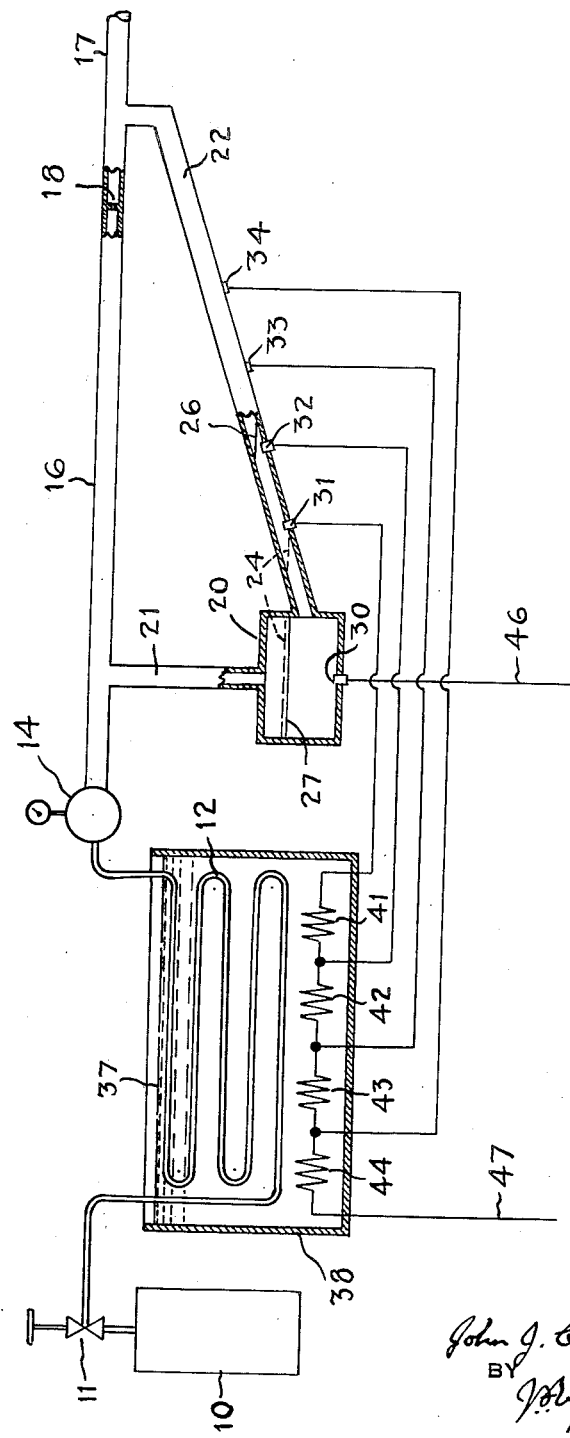
INVENTOR
John J. Crowe
BY
ATTORNEY Patented Nov. 12, 1940

2,221,077

UNITED STATES PATENT OFFICE 2,221,077

GAS SUPPLY SYSTEM

John J. Crowe, Westfield, N. J., assignor to Air Reduction Company, Incorporated, New York, N. Y., a corporation of New York Application October 19, 1938, Serial No. 235,815

13 Claims. (Cl. 62—122)

This invention relates to apparatus for heating gas and is especially intended for heating high-pressure carbon dioxide gas before the gas expands to lower pressure in a regulator.

In regulators used for carbon dioxide, the cooling of the gas upon expansion often causes carbon dioxide snow to collect in the regulator and at the regulator seat. The snow sometimes causes variations in the delivery pressure, and sometimes completely stops the gas flow.

This snow formation can be eliminated by warming the high-pressure gas before it reaches the regulator. This expedient is successful with gas lines which have a constant demand because the heat input can be regulated so as to impart sufficient heat to the gas to prevent freezing without overheating the gas to such a temperature that damage to the internal parts of the regulator may result.

When the gas flow is not constant, and the flow is at a low rate, or completely stopped for a period, the heat input adjusted for a substantial flow will raise the temperature of the gas to such a value that the gas upon entering the regulator may cause damage to the regulator seat.

It is an object of this invention to provide improved apparatus for heating compressed gas before it expands in a regulator. More specifically, it may be said that it is an object of the invention to provide improved means for preventing the formation of snow in carbon dioxide pressure regulators.

The invention includes heating apparatus, between the high-pressure gas supply and the pressure regulator, with control means responsive to the gas flow. When the gas flow stops, the heating apparatus is shut off. When gas flow is resumed, heat is again supplied to the gas, and one feature of the invention, for lines having a wide range of flow rates, provides heating that is proportional to the rate of flow.

Other objects, features and advantages of the invention will appear or be pointed out as the specification proceeds.

The drawing is a diagrammatic illustration of the preferred embodiment of the invention, with parts of the structure shown in section.

Carbon dioxide gas is supplied from a high-pressure source, such as a storage vessel or cylinder 10 which has a shut-off valve 11. The gas passes through an extended passage including a pipe coil 12 to the high-pressure or inlet side of a pressure regulator or reducing valve 14. The regulator may be any one of various kinds which receive gas at high pressure and discharge it at a reduced or low pressure. Such a regulator is described in the Deming Patent 1,839,837, dated January 5, 1932.

The low-pressure or outlet side of the regulator 14 is connected with a delivery conduit 16 through which gas flows to a distributing line 17. There is an orifice 18 in the conduit 16 for creating a pressure differential that is proportional to the rate of flow of the gas.

A well 20 partially filled with an electrically conductive liquid, preferably mercury, communicates with the conduit 16, on the left or regulator side of the orifice 18, through a tube 21. Another tube 22, connected with the well 20 below the surface of the mercury, communicates with the conduit 16 on the right or low-pressure side of the orifice 18. The tube 22 is preferably disposed on a gradual slope so that small changes in the level of the mercury cause a substantial movement of the mercury lengthwise along the tube 22. The well 20 and tubes 21, 22 form a U-tube which is of somewhat distorted shape, but which operates on the same principles of physics as other U-tubes.

When no gas is flowing in the conduit 16, the pressure on both sides of the orifice 18 is equal, and the mercury stands at the same level in the well 20 and tube 22. The mercury level when there is no gas flowing is indicated by the dotted line 24.

When gas is flowing in the conduit 16, the pressure on the left side of the orifice 18 is higher than on the right, and the mercury therefore rises in the tube 22 to a level above that in the well 20. In the drawing the mercury levels in the tube 22 and well 20 are indicated by the reference characters 26 and 27, respectively. These levels correspond to the pressure differential created by a certain rate of flow through the orifice 18. Every change in the rate of gas flow produces a change in the mercury levels. The greater the flow rate, the higher the mercury level rises in the tube 22.

There is an electrical contact 30 in the mercury well 20, and there are electrical contacts 31—34 at spaced points along the tube 22. The mercury always touches the contact 30, and when gas is flowing in the conduit 16 the mercury forms an electric circuit between the contact 30 and any of the contacts 31—34 to which it rises in the tube 22. This structure is, therefore, a mercury switch and a multi-contact switch.

The coil of piping 12 can be heated in a number of different ways, as by applying electric resistance heating coils direct to the pipe. The preferred embodiment of the invention immerses the coil of piping 12 in a liquid bath 37 in a container 38. The mass of liquid is limited to a value that will not store too much heat, and the liquid container 38 is equipped with heating apparatus comprising electric resistance heater units 41—44.

These heater units 41—44 are connected in series, and the right ends of these units are connected with the contacts 31—34, respectively. When the mercury level in the tube 22 is above the contact 31 but below the contact 32, a circuit is closed from a power line 46 through the contact 30, and through the mercury, the contact 31, and all of the heater units 41—44 to a return power line 47.

When the rate of gas flow increases enough to raise the level of the mercury in the tube 22 above the contact 32, but not as high as the contact 33, there is a direct circuit from the mercury through the contact 32 to the heater unit 42, which circuit by-passes the heater unit 41. With this circuit there are only three heater units in series instead of four, and the reduced resistance results in a greater flow of current so that more heat is supplied to the liquid bath and through it to the gas in the piping 12.

In like manner, a rise in the mercury level to the contact 33 closes a circuit that by-passes both heater units 41 and 42, and causes the full voltage to be impressed on the two heater units 43 and 44, with resulting increase in current and heat. The greatest heating is obtained when the mercury level in the tube 22 rises to the level of the highest contact 34, which causes full voltage to be impressed on the single heater unit 44.

It will be understood that more or fewer electrical contacts can be used along the length of the tube 22, depending upon the variation and graduation in heating desired for the particular installation. Where the flow is intermittent but the demand, when there is any demand, does not vary over a wide range, a single contact 31 in the tube 22 is sufficient.

For simplicity in illustration the current that passes through the mercury switch is supplied direct to the heater units, but with large-size heater units the current through the mercury switch is used merely as the control current for operating relay switches that carry the full heater power.

The heater units 41—44 can be connected in parallel and one or more of them brought into service each time the mercury rises to the level of the next contact along the tube 22. Various other changes and modifications may be made, and some features of the invention may be used without others.

I claim:

1. In a gas supply system in which high-pressure gas is warmed by heating means during its travel from a storage cylinder to a pressure regulator in which the gas is expanded to a reduced pressure, the improvement which comprises apparatus for controlling the operation of the gas heating means including a flow-responsive device operated by gas flowing in said system.

2. Gas distributing apparatus including a source of gas, a pressure regulator through which the gas passes on its way to a delivery line, apparatus between said source and regulator for warming the gas, and electrically-operated means responsive to the flow of gas and adapted to control the supply of heat from said apparatus.

3. In a gas supply system having a pressure regulator, a supply passage through which gas flows from a high-pressure gas source to the regulator, and a delivery passage through which gas flows from the regulator to a distributing line, heater apparatus associated with the supply passage for warming the gas before it reaches the regulator, an orifice in the delivery passage for creating a pressure differential in said delivery passage, and control apparatus for the heater communicating with the delivery passage on different sides of the orifice and operated by the pressure differential across said orifice.

4. The combination with a source of high-pressure gas, of a pressure regulator, means for heating the gas between the high-pressure source and the pressure regulator, and control apparatus responsive to the gas flow and adapted to start and stop the operation of the heating means with corresponding changes in the gas flow.

5. The combination comprising a regulator, and piping through which gas is supplied to said regulator from a high-pressure source, a liquid container in which at least a portion of said piping is immersed in liquid, heating means for warming the liquid, and control apparatus responsive to the gas flow for regulating the operation of the heating means.

6. In a gas supply system, piping through which gas at high pressure is supplied to a pressure regulator, heating apparatus associated with said piping for warming the gas on its way to the regulator, an electrical switch that controls the heating apparatus, an orifice in said system for creating a pressure differential, and means through which said pressure differential operates the electrical switch.

7. In a gas supply system, piping through which gas at high pressure is supplied to a pressure regulator, a variable output heating apparatus associated with said piping for warming the gas on its way to the regulator, and means responsive to the gas flow in the system for controlling said heating apparatus, said means including a multi-contact electrical switch that closes a circuit through different contacts for different rates of gas flow.

8. Apparatus for supplying carbon dioxide gas including in combination a storage cylinder in which the carbon dioxide is contained under high pressure, a shut-off valve at the outlet of said cylinder, a pressure regulator which receives gas at high pressure and delivers it at a reduced pressure, piping including a coil through which the gas flows from the shut-off valve to the regulator, a liquid container in which the coil of piping is immersed in a liquid, multiple-unit heating apparatus comprising several electric resistance heating coils connected in series and located at the bottom of said container in position to heat the liquid in said container, a delivery pipe on the low-pressure side of the regulator, an orifice in the delivery pipe, a mercury well, a tube connecting the mercury well with the delivery pipe on the regulator side of the orifice, another tube connecting with the delivery pipe on the other side of the orifice and entering the mercury well on a slope at an acute angle to the horizontal and below the level of the mercury, an electrical contact in the mercury well and other electrical contacts located at spaced points along the sloping tube and connected with the respective heating coils in a manner to by-pass more of the coils as the mercury touches contacts higher in the sloping tube.

9. A gas pressure-reducing valve with means for heating a gas as it approaches the reducing valve, and means responsive to the rate of delivery from the reducing valve for controlling the heating means.

10. The combination with a gas pressure-reducing valve having apparatus that heats incoming gas before it reaches said valve, of control means for said apparatus including a delivery line from said valve, an orifice in said line, and a mercury switch comprising a U-tube with its ends communicating with the delivery line on opposite sides of the orifice.

11. The combination with a gas pressure-reducing valve, of a heater for incoming gas, an orifice through which outflowing gas passes, and a mercury switch controlling the heater operation, said switch comprising a U-tube connected across said orifice with a plurality of electrical contacts on the low-pressure side of the U-tube.

12. A carbon dioxide distributing system including a storage vessel from which gas is supplied at high pressure, a pressure regulator, piping connecting the storage vessel with the inlet side of said regulator, heating apparatus that warms the piping and gas sufficiently to prevent the carbon dioxide from cooling below the snow point when expanded in the pressure regulator, and control means operated by the flow of gas in said system for shutting off the heating apparatus when the gas flow stops.

13. In a carbon dioxide distributing system having a high-pressure storage vessel, pressure regulator, and apparatus for heating the gas during its passage from said storage vessel to the regulator, the improvement which comprises control means for regulating the amount of heat supplied by the heating apparatus, said control means including an orifice in the delivery line from the regulator, and a multi-contact electrical switch operated by the pressure differential across said orifice to energize different contacts as said pressure differential increases, the switch and heating apparatus being so correlated that the contacts successively energized as the rate of gas flow through the orifice increases cause successive increases in the amount of heat supplied to the gas to compensate for the increased quantity of gas and keep the temperature of the gas at such a level that the reduced temperature reached upon expansion in the regulator is above the snow point of the carbon dioxide.

JOHN J. CROWE.